United States Patent
Drechsler et al.

(10) Patent No.: US 7,090,249 B2
(45) Date of Patent: Aug. 15, 2006

(54) GAS BAG WITH LIMITING STRAPS

(75) Inventors: Amrei Drechsler, Waldaschaff (DE); Claudia Gross, Lohr (DE); Jan Isensee, Bad Vilbel (DE); Dominik Schütz, Waldaschaff (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 214 days.

(21) Appl. No.: 10/650,639

(22) Filed: Aug. 28, 2003

(65) Prior Publication Data

US 2004/0041384 A1    Mar. 4, 2004

(30) Foreign Application Priority Data

Sep. 4, 2002   (DE)   .................. 202 13 651 U

(51) Int. Cl.
*B60R 21/23* (2006.01)

(52) U.S. Cl. ................................. 280/743.2
(58) Field of Classification Search ............ 280/743.2, 280/743.1, 731
See application file for complete search history.

(56) References Cited

U.S. PATENT DOCUMENTS

| | | | | |
|---|---|---|---|---|
| 4,934,734 A | | 6/1990 | Takada | |
| 5,186,489 A | * | 2/1993 | Imai | 280/728.2 |
| 5,478,114 A | * | 12/1995 | Maurer et al. | 280/743.2 |
| 5,607,183 A | | 3/1997 | Nishimura et al. | |
| 5,678,858 A | * | 10/1997 | Nakayama et al. | 280/743.2 |
| 6,209,911 B1 | * | 4/2001 | Igawa et al. | 280/740 |
| 2001/0015545 A1 | | 8/2001 | Igawa et al. | |
| 2002/0056978 A1 | * | 5/2002 | Keshavaraj | 280/743.2 |

FOREIGN PATENT DOCUMENTS

| | | |
|---|---|---|
| EP | 0611683 | 8/1994 |
| GB | 2261855 | 6/1993 |
| JP | 02299952 | 12/1990 |
| JP | 06286541 | 10/1994 |
| JP | 10166978 | 6/1998 |

* cited by examiner

*Primary Examiner*—David R. Dunn
(74) *Attorney, Agent, or Firm*—Tarolli, Sundheim, Covell & Tummino LLP

(57) ABSTRACT

A gas bag comprising a gas bag wall with an upper portion and limiting straps connecting the upper portion to an opposite portion of the gas bag wall has a connecting ring, from which the limiting straps originate. At least one reinforcement layer is provided between the connecting ring and the upper portion. At least one first seam fastens the connecting ring and the reinforcement layer to the upper portion, and at least one second seam only fastens the reinforcement layer to the upper portion, the second seam being arranged radially outside the first seam.

7 Claims, 3 Drawing Sheets

US 7,090,249 B2

GAS BAG WITH LIMITING STRAPS

FIELD OF THE INVENTION

The invention relates to a gas bag with an upper portion and with limiting straps connecting the upper portion with an opposite portion of the gas bag wall.

BACKGROUND OF THE INVENTION

The arrangement of limiting straps in the gas bag is a proven means to establish the unfolding behaviour and the inflated shape of the gas bag. In order to improve the force distribution between the limiting straps and an upper portion of the gas bag wall directed towards an occupant of a vehicle, reinforcement layers are used, the fastening of the limiting straps and the reinforcement layers to the gas bag wall normally taking place by means of seams.

BRIEF SUMMARY OF THE INVENTION

It is an object of the invention to provide a way to optimize the introduction of force into and the distribution of force in the gas bag wall.

This is achieved in a gas bag comprising a gas bag wall with an upper portion and limiting straps connecting the upper portion to an opposite portion of the gas bag wall. The gas bag has a connecting ring, from which the limiting straps originate. At least one reinforcement layer is provided between the connecting ring and the upper portion. At least one first seam fastens the connecting ring and the reinforcement layer to the upper portion. At least one second seam only fastens the reinforcement layer to the upper portion, the second seam being arranged radially outside the first seam.

This arrangement leads to an improved force distribution, because both the vertically acting forces which are introduced from the limiting straps into the gas bag wall on inflation of the gas bag, and also the horizontally acting forces, which are transferred to the gas bag wall by the internal pressure of the gas bag, are respectively received by one of the seams. The receiving of the forces can also take place with chronological staggering, the vertical tensile stresses received by the first seam or seams being received in the first phase of unfolding of the gas bag, and the horizontal tensile stresses received from the second seam or seams being received in a later phase of unfolding. Through the provision of a connecting ring, which has a recess in the centre, in addition the region of the gas bag wall on which the limiting straps are fastened, can be held relatively flexibly, which provides for a more uniform introduction of force into the gas bag wall then with a disc-shaped connecting element. In addition, the material requirement for the gas bag and also the volume of the folded gas bag can thus be reduced.

It proves to be advantageous when the first seam is arranged radially inwards of the transition of the limiting straps to the connecting ring, because the connecting ring can thus be fastened particularly well to the gas bag wall.

Preferably, the second seam is arranged radially outside the connecting ring. It has been found that a good introduction of force can thus be achieved.

In contrast to the connecting ring, the reinforcement layer is preferably constructed in a disc shape, and therefore does not have a central cut-out.

The connecting ring, the limiting straps and also the reinforcement layer can consist of pieces of fabric. In a preferred embodiment of the invention, the connecting ring and the limiting straps are formed in one piece, i.e. are of one common piece of fabric. The remnants from the blank, for instance the cut-out of the connecting ring, can be further used in other places in the gas bag, e.g. as reinforcement.

Preferably, the gas bag has circular cross-section and the connecting ring is situated in the centre of the circle, so that the introduction of force takes place as symmetrically as possible (in relation to a top view onto the gas bag). The limiting straps are preferably arranged symmetrically in a star shape on the connecting ring, in order to support a uniform introduction of force.

Of course, other gas bag shapes are also possible, the shape of the connecting ring and the arrangement of the limiting straps being able to be coordinated with the respective symmetry.

DETAILED DESCRIPTION OF A PREFERRED EMBODIMENT

Figure 1:
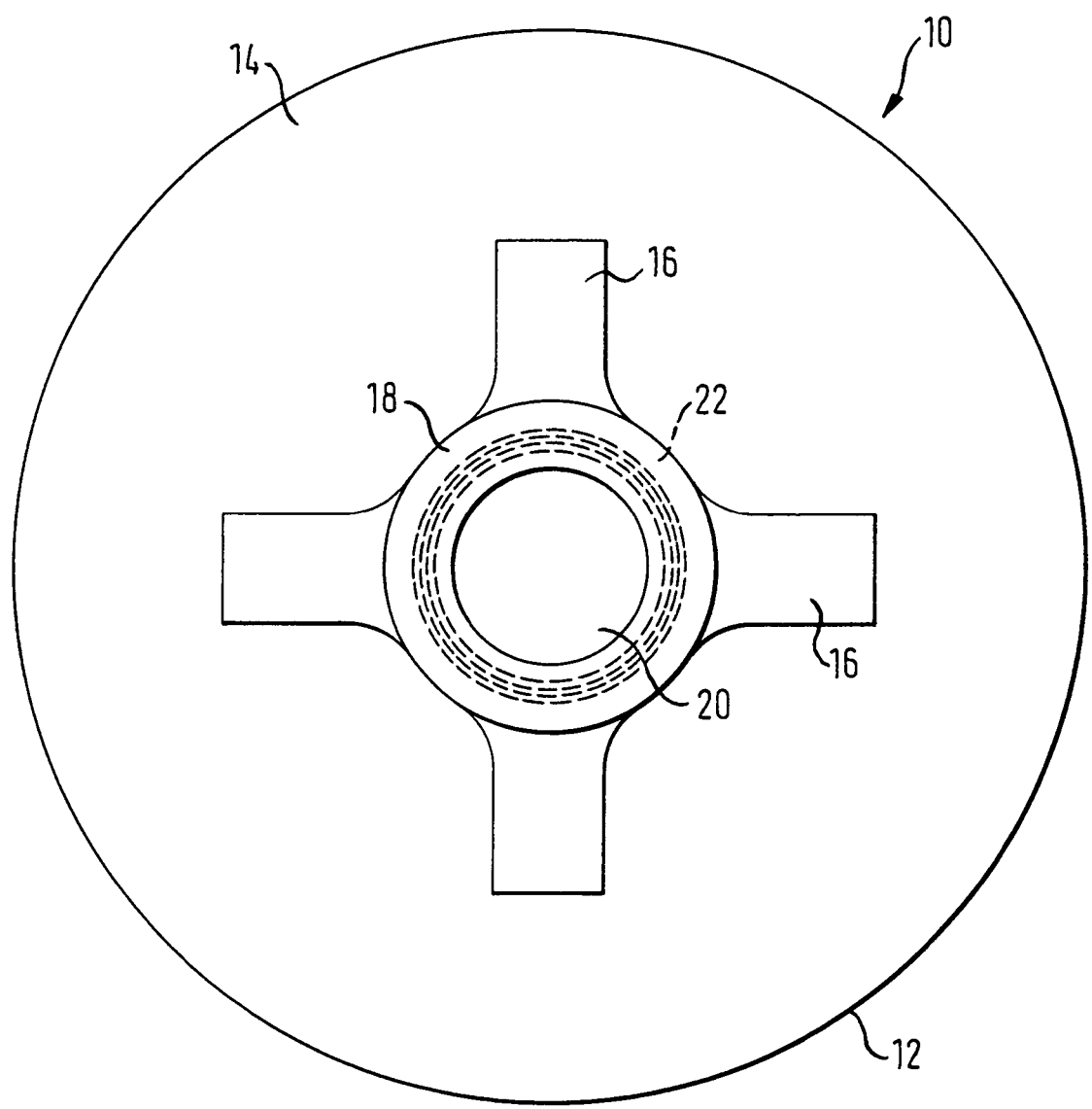
FIG. 1 shows a diagrammatic view of a gas bag according to the invention.

FIG. 1 shows a gas bag 10, which is delimited by a gas bag wall 12. The gas bag wall 12 comprises an upper portion 14 and an opposite lower portion lying opposite the upper portion 14 and having a gas inlet opening. In FIG. 1, the direction of view is from the interior of the gas bag 10 to the upper portion 14. The lower portion is not shown. The upper portion 14 is the region of the gas bag 10 with which the occupant comes into contact.

The upper portion 14 and underside of the gas bag 10 are additionally connected by limiting straps 16 which run through the interior of the gas bag 10.

The limiting straps 16 are connected with the circumferentially closed connecting ring 18, which has a cut-out 20 in its interior. In the example shown here, the connecting ring 18 and limiting straps 16 are constructed as a common fabric layer, i.e. are of one piece only, but they may also be composed from several sections.

The connecting ring 18 is connected on the inner face of the gas bag 10 with its upper portion 14, in order to fix the limiting straps 16 to the wall 12, a reinforcement layer 22 being arranged between the connecting ring 18 and the upper portion 14 of the gas bag. The reinforcement layer is preferably likewise a fabric layer and has a disc-shaped form here, therefore does not have a cut-out. Several reinforcement layers may also be provided.

The ends of the limiting straps 16 which are not connected with the connecting ring 18 are fastened in a known manner for example on the underside of the gas bag.

Figure 2:
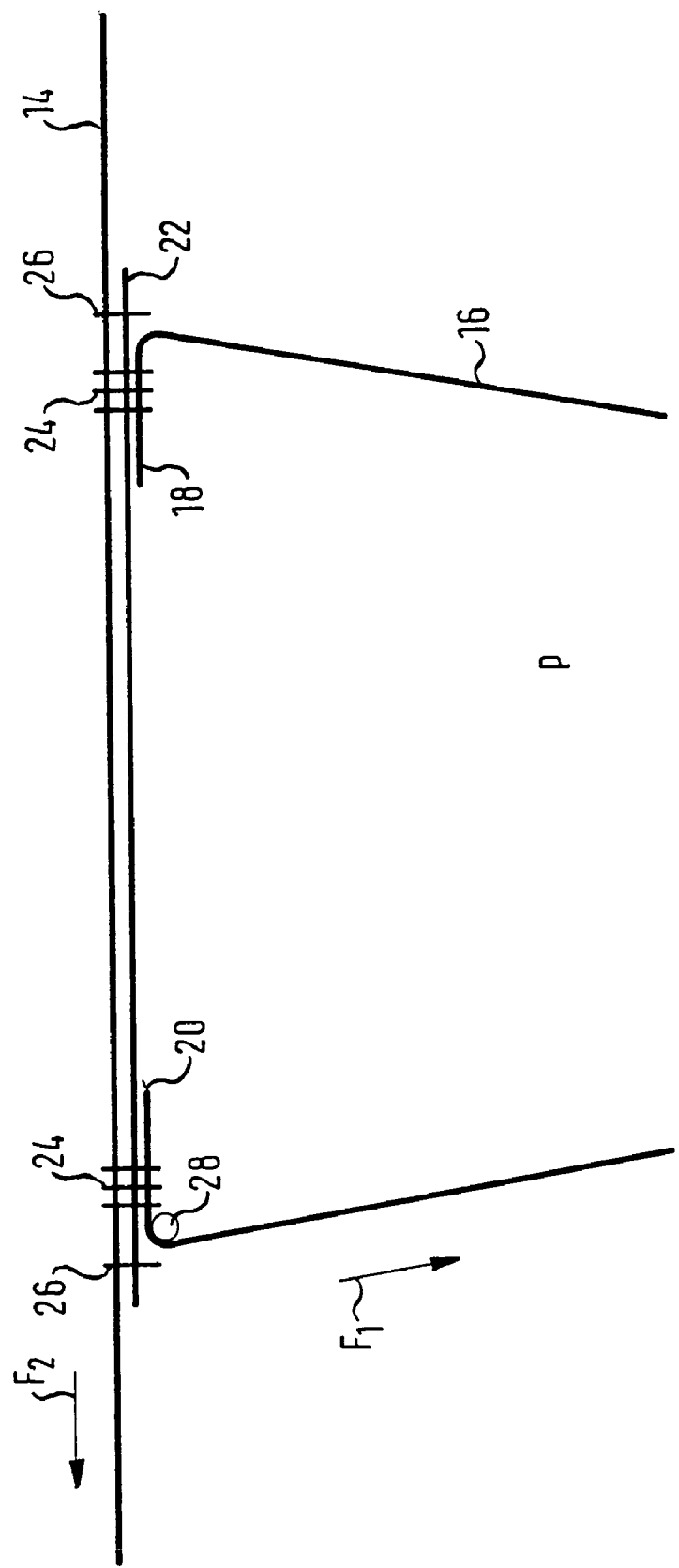
FIG. 2 shows a diagrammatic sectional view of a gas bag according to the invention.

The fastening of the limiting straps 16 to the upper portion 14 of the gas bag is illustrated in closer detail in FIG. 2. First seams 24, three seams in the example shown here, connect the connecting ring 18, the reinforcement layer 22 and the upper portion 14 of the gas bag 10 firmly with each other. Radially outwards of the first seams 24, a second seam 26 is provided, which only connects the reinforcement layer 22 with the upper portion 14 of the gas bag. The number of seams is not limited to those indicated in the example shown here.

In the example shown here, the second seam 26 lies radially outside the connecting ring 18. It also lies respectively radially outside a point 28 at which a limiting strap 16 continues into the connecting ring 18 and which coincides substantially with the point at which the limiting strap 16 bends off from the connecting ring 18 into the interior of the gas bag 10.

Both the first seams 24 and also the second seam 26 are constructed here so that they completely surround the connecting ring 18 or respectively the reinforcement layer 22 peripherally. Whereas the first seams 24 run in the centre of the connecting ring 18, the second seams 26 in this example are arranged on the edge of the reinforcement layer 22.

Figure 3:
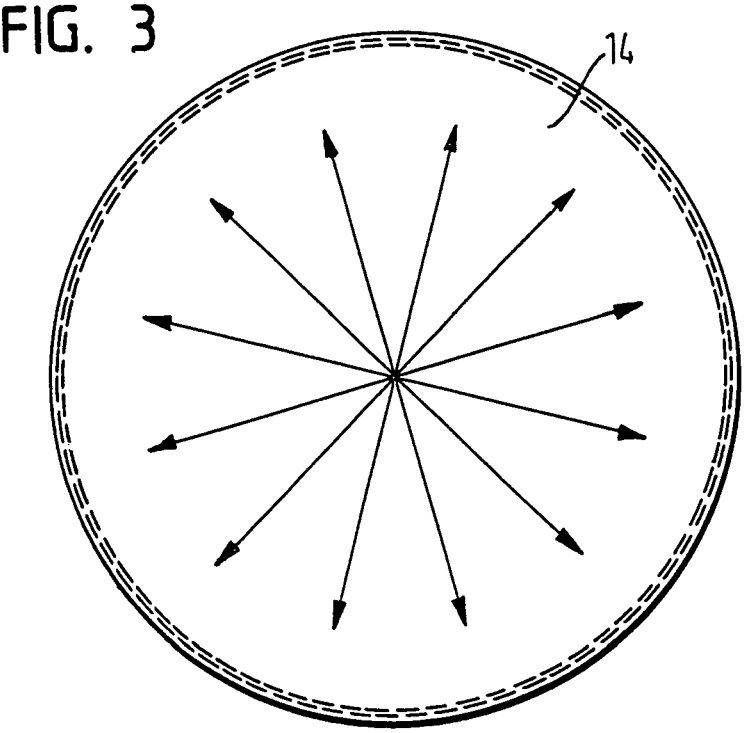
FIG. 3 shows a diagrammatic view of the introduction of force into the gas bag wall in a gas bag according to the invention.
Figure 4:
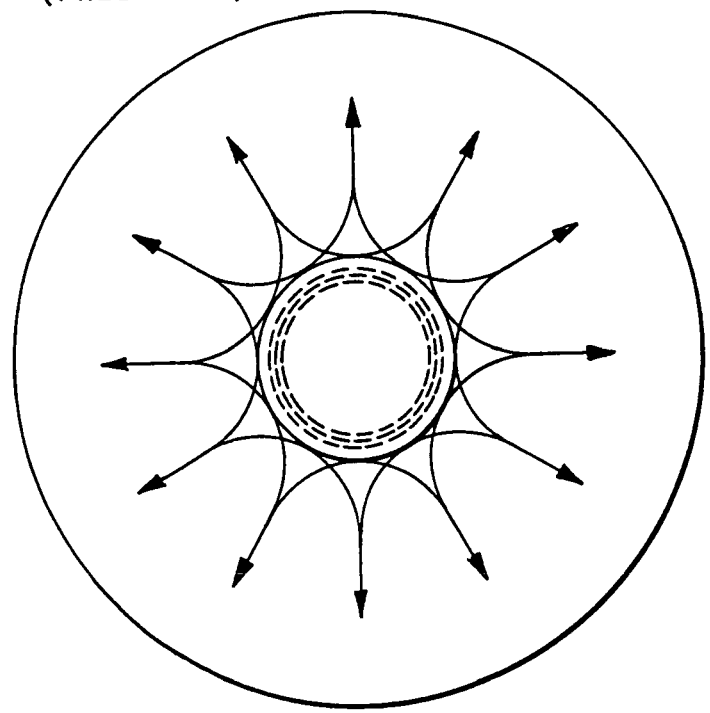
FIG. 4 shows a diagrammatic view of the introduction of force into the gas bag wall in accordance with the prior art.

The first and second seams 24, 26 serve to receive different forces. The first seams 24 principally receive vertically acting forces $F_1$, which are transferred from the limiting straps 16 to the gas bag wall 12. The second seams 26, on the other hand, principally receive horizontal forces $F_2$, which are brought about by the internal pressure p of the gas bag 10. Through the provision of special seams 24, 26 to receive the respective forces $F_1$, $F_2$, an advantageous introduction of force into the gas bag wall can be achieved. The cut-out 20 of the connecting ring 18 likewise contributes to a more uniform distribution of forces, because hereby the upper portion 14 of the gas bag is held more flexibly than in the case of a disc-shaped limiting strap carrier. The introduction of force is illustrated diagrammatically in FIG. 3, which shows the stress pattern on the upper portion 14 of the gas bag 10. Compared with this, the stress pattern in a conventional gas bag is illustrated in FIG. 4.

As can be seen in FIG. 1, in a circular gas bag the connecting ring 18 is preferably constructed in the form of a circular ring and, in relation to the cross-section of the gas bag 10, is arranged in the centre of the gas bag 10.

The idea of the invention is also transferable to other gas bag shapes, the shape of the connecting ring being able to be adapted to the shape of the gas bag.

The arrangement of the seams and the limiting straps on the connecting ring are illustrated here only by way of example. The optimum construction can be determined by a specialist in the art according to the given requirements.

The invention claimed is:

1. A gas bag comprising:
   a gas bag wall (12) with an upper portion (14), said upper portion (14) being at which an occupant comes into contact and
   limiting straps (16) connecting said upper portion (14) to an opposite portion of said gas bag wall (12),
   a connecting ring (18) defining a cut-out (20) in an interior portion of said connecting ring, said connecting ring (18) having a peripheral portion from which said limiting straps (16) originate,
   said connecting ring (18) being formed together with said limiting straps (16) as a single piece of fabric,
   at least one reinforcement layer (22) provided between said connecting ring (18) and said upper portion (14),
   at least one first seam (24), by which said connecting ring (18) and said reinforcement layer (22) are sewn to said upper portion (14), and
   at least one second seam (26), which only fastens said reinforcement layer (22) to said upper portion (14), said second seam (26) being arranged radially outside said first seam (24).

2. The gas bag according to claim 1, wherein said first seam (24) is arranged radially inwards of a transition (28) of said limiting straps (16) to said connecting ring (18).

3. The gas bag according to claim 1, wherein said second seam (26) is arranged radially outside said connecting ring (18).

4. The gas bag according to claim 1, wherein said reinforcement layer (22) is disc-shaped.

5. The gas bag according to claim 1, wherein said connecting ring (18), said limiting straps (16) and said reinforcement layer (22) consist of fabric pieces.

6. The gas bag according to claim 1, wherein said gas bag (10) has a circular cross-section and said connecting ring (18) is situated in a centre of said circle.

7. The gas bag according to claim 1, wherein said first seam (24) extends through said connecting ring (18) and said reinforcement layer (22).

* * * * *